United States Patent [19]
Pye

[11] 3,709,300
[45] Jan. 9, 1973

[54] HYDRAULIC FRACTURING PROCESS
[75] Inventor: David S. Pye, Brea, Calif.
[73] Assignee: Union Oil Company of California, Los Angeles, Calif.
[22] Filed: Aug. 27, 1971
[21] Appl. No.: 175,643

[52] U.S. Cl.................................166/280, 166/308
[51] Int. Cl.......................E21b 43/26, E21b 43/27
[58] Field of Search......166/280, 308, 283, 282, 281

[56] References Cited
UNITED STATES PATENTS

| | | | |
|---|---|---|---|
| 3,285,340 | 11/1966 | Huitt et al. | 166/280 |
| 3,302,719 | 2/1967 | Fischer | 166/280 |
| 3,316,965 | 5/1967 | Watanabe | 166/280 |
| 3,323,594 | 6/1967 | Huitt et al. | 166/308 |
| 3,349,851 | 10/1967 | Huitt et al. | 166/280 |
| 3,455,388 | 7/1969 | Huitt | 166/308 X |
| 3,455,390 | 7/1969 | Gallus | 166/308 X |
| 3,460,622 | 8/1969 | Davis, Jr. | 166/308 X |
| 3,592,266 | 7/1971 | Tinsley | 166/308 X |
| 3,642,068 | 2/1972 | Fitch et al. | 166/308 X |

Primary Examiner—Stephen J. Novosad
Attorney—Milton W. Lee et al.

[57] ABSTRACT

A process for hydraulically fracturing a permeable subterranean formation in which the fracture faces are treated to reduce their permeability to the fracturing fluid and propping agent is placed in the fracture in a conventional manner whereby the bulk of the propping agent is deposited in the fracture at a location remote from the well, and thereafter the fracture faces are treated to restore their permeability to subsequently injected fluids and propping agent is again injected into the fracture whereby the bulk of the propping agent is deposited in the fracture adjacent to the well. In this manner, fluid conductively through the fracture is assured.

24 Claims, 2 Drawing Figures

PATENTED JAN 9 1973    3,709,300

INVENTOR.
DAVID S. PYE
BY Dean Sandford
ATTORNEY

HYDRAULIC FRACTURING PROCESS

BACKGROUND OF THE INVENTION

This invention relates to the hydraulic fracturing of permeable subterranean earth formations, and more particularly to the placement of particles of solid propping agent within a fracture formed in such formation.

The hydraulic fracturing process is widely used for stimulating fluid producing and injection wells. In practicing this method, a fracturing fluid comprised of an aqueous or oleaginous liquid, and usually containing fluid loss reducing and/or friction loss agents, is pumped down the well at an elevated pressure to subject a portion of the formation exposed at the well to hydraulic pressure sufficient to cause the formation to open and thereby form a fracture extending outwardly from the well into the surrounding formation. The fluid loss reducing agent is deposited upon the exposed faces of the formation to provide a mat or layer of material that substantially reduces the flow of fracturing fluid into the permeable formation. Additional fracturing fluid is then pumped down the well and into the fracture at a pressure and volume flow rate sufficient to extend the fracture a desired distance from the well. In many formations, the tendency is for the fractures formed in the formation to be oriented in a substantially vertical plane, i.e., a fracture parallel to the axis of the well and extending along a substantial length of the well is initially formed and extended outwardly into the formation.

Typically, once the fracture is initiated and opened to a sufficient width to accept propping agent, solid particles of propping agent are suspended in the fracturing fluid and injected into the fracture. The combined effects of sedimentation and reduction in fluid velocity resulting from the loss of fracturing fluid to the permeable formation causes the solid particles of propping agent to be deposited between the walls of the fracture at a point remote from the well. The solid propping agent prevents the fracture from closing or healing when the hydraulic pressure is reduced, thus providing a highly permeable media within the fracture to facilitate the flow of fluids from the formation to the well in the case of producing wells, and from the well into the formation in the case of injection wells. In a conventional fracturing operation, the fluid loss reducing additive is removed from the formation faces by being dissolved in the produced fluids and/or by being entrained in these fluids. However, in the usual case, there is no control over the extent to which the permeability of the formation is restored. Thus, need exists for a positive means of restoring the permeability of the formation, particularly at the fracture faces.

Furthermore, it is highly desirable that the distribution and height of the body of propping agent deposited in the fracture be such that the permeability of the fracture is assured, and that the fracture does not heal when the hydraulic pressure exerted against the formation is reduced. It is particularly critical that the portion of the fracture immediately adjacent to the well contain sufficient propping agent to assure a high fracture permeability and to resist healing of the fracture in this area. Unfortunately, in conventional fracturing operations, the velocity of the fracturing fluid entering the fracture through apertures in the casing or liner and the surrounding cement sheath tends to sweep propping agent away from this critical area and to prevent deposit of propping agent near the well. Typically, the particles of propping agent are deposited in a bank of maximum height in a region of the fracture remote from the well, thus there is often insufficient buildup of propping agent in the fracture immediately adjacent to propping agent in the fracture immediately adjacent to the well to resist healing of the fracture. Hence, fracture permeability is often restricted in this critical area.

It has been suggested that propping agent can be placed in the fracture adjacent to the well by reducing the fluid injection rate near the end of the fracturing operation. Also, it has been proposed to simultaneously reduce the fluid injection rate and increase the concentration of propping agent in the injected fluid to achieve the desired placement of propping agent. However, these techniques are not advantageous since reducing the fluid injection rate results in a narrower fracture width which can prevent the entry of propping agent into the fracture, or cause bridging within the fracture. Also, a reduced fluid injection rate increases the pumping time required, which increases the cost of the operation. Moreover, despite these attempts to control placement of the propping agent, there is a strong tendency for the particles of propping agent to form a packed bank in the fracture remote from the well. Thus, need exists for an effective method of achieving placement of propping agent in the fracture adjacent to the well to prevent healing of the fracture and to assure communication between the fracture and the well in this critical area.

Accordingly, it is a principal object of this invention to provide an improved method for hydraulically fracturing a permeable subterranean formation to provide therein fractures having increased fluid conductivity.

Another object of the invention is to provide a method for hydraulically fracturing a permeable subterranean formation that achieves placement of the propping agent in the fracture adjacent to the well.

A further object of the invention is to provide a hydraulic process that produces high permeability channels communicating the formation with the well.

A still further object of the invention is to provide an improved method of propping fractures formed in permeable subsurface formations whereby substantially increased fluid conductivity is obtained.

A yet further object of the invention is to provide an improved method of propping fractures formed in permeable subsurface formations adjacent to the well.

These and other objects and advantages of the invention will be apparent from the following detailed description.

SUMMARY OF THE INVENTION

This invention provides a method for fracturing a subterranean formation traversed by a well in which the deposition of propping agent in the fracture adjacent to the well is assured. In accordance with this invention, the fracture is formed and extended and an initial deposit of propping agent placed in the fracture using a low fluid loss fracturing fluid so that the permeability of the exposed faces of the fracture is reduced, then, after initial placement of the propping agent, the permeability of the formation is restored and additional propping agent deposited in the fracture using a fluid having a high fluid loss characteristic. In one mode of practicing the invention, the fracturing fluid employed in the first stage of the propping agent treatment is a viscous carrier liquid having solid particles of fluid loss reducing agent dispersed therein, and in which the solid particles of propping agent are dispersed. As the fracturing fluid enters the induced fracture and extends the fracture into the formation, the fluid loss reducing agent is deposited on the exposed faces of the fracture, thereby substantially decreasing their permeability to subsequently injected fluids. The propping agent is carried into the fracture by the fracturing fluid and the bulk of the agent is deposited in the fracture at a location remote from the well. After buildup of an initial deposit of propping agent, the permeability of the exposed faces of the fracture is restored by dissolving the deposited fluid loss reducing agent, and additional propping agent is injected into the fracture in a carrier liquid having a high fluid loss characteristic. A large proportion of the propping agent injected into the fracture in the second stage of the treatment is deposited in the fracture adjacent to the well, thereby assuring fracture permeability in the critical area adjacent to the well.

When the permeable subterranean formation subjected to the fracturing treatment is an oil-producing formation, a preferred fluid loss agent is finely divided particles of an oil-soluble, water-insoluble solid composition which can be dispersed in an aqueous carrier liquid. After treatment with a fluid loss reducing agent of this type, formation permeability can be restored by treating the exposed fracture faces with an oil. In another preferred embodiment of the invention, the fluid loss reducing agent is finely divided solid particles of an acid-soluble composition which is removed from the fracture faces by subsequent treatment with acid. Where an oil base fracturing fluid is employed, the use of an oil-insoluble, water-soluble fluid loss reducing agent is preferred. The agent employed to remove the solid fluid loss reducing agent from the fracture faces can be injected into the fracture as a separate liquid slug following the first stage treatment with propping agent and preceding the second stage propping agent treatment, or the high fluid loss characteristic fracturing fluid employed in the second stage treatment can be the solvent for the previously injected fluid loss reducing agent, this eliminating the need for a separate treating step.

BRIEF DESCRIPTION OF THE DRAWINGS

The invention is further defined by the accompanying drawings, wherein like numerals refer to like parts throughout, and wherein.

DETAILED DESCRIPTION

Figure 1:
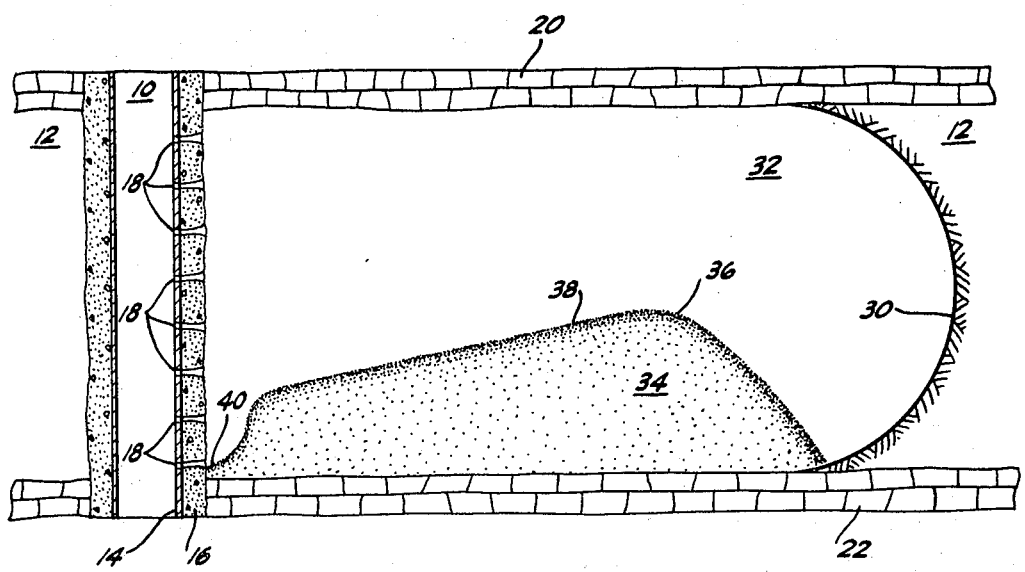
FIG. 1 is a vertical sectional view of a permeable subterranean formation traversed by a well illustrating the placement of propping agent in a vertical fracture by the conventional method employed in the first stage treatment of this invention.

As shown in the drawings, the lower portion of well 10 is illustrated traversing a permeable fluid-bearing formation 12 that is to be fractured in accordance with the method of this invention. Well 10 is illustrated cased and cemented through formation 12 with casing 14 surrounded by an outer cement sheath 16. Casing 14 and cement sheath 16 are provided with a plurality of perforations 18 to provide communication between the well and formation 12. In the illustrated embodiment, formation 12 is bounded at its upper and lower extremities by substantially impermeable strata 20 and 22, respectively. While the practice of this invention is depicted in a particular well configuration, it is to be recognized that the method is amenable to practice in both cased and uncased wells and in wells completed with conventional slotted liners, and that the method can be practiced to fracture permeable earth strata of any type that are amenable to hydraulic fracturing. Furthermore, as a matter of convenience, the perforations 18 in casing 14 are illustrated as being located at one side of the casing, whereas in conventional practice, the perforations will be spaced about the periphery of the casing.

The fracturing operation is initiated in conventional manner by pumping a spearhead of fracturing fluid down well 10, through apertures 18 and into contact with formation 12 at a pressure and volume flow rate sufficient to form a fracture in the permeable formation adjacent to the well, and to extend the fracture outwardly into the formation. The fracturing fluid is a viscous oil-base or water-base fluid containing dispersed particles of a finely divided solid fluid loss reducing agent. The fluid loss reducing agent is essentially insoluble in the fracturing fluid, and the particulate agent is transported by the fluid into contact with the exposed formation faces whereupon the finely divided particles enter into the larger flow channels and interstices of the formation and deposit on the exposed face of the formation to form a mat thereon tending to restrict the flow of the fracturing fluid into the permeable formation. The loss of fracturing fluid into the formation rapidly decreases as the mat of solid fluid loss reducing agent is established, the total quantity of fluid lost to the formation being controlled, to a large degree, by the quantity of fluid loss reducing additive employed. The decreased loss of fluid into the formation tends to confine the injected fracturing fluid within the well and the fracture, allowing the hydraulic pressure exerted against the formation to be increased causing the fracture to be extended into the formation. After the fracture has been started and widened sufficiently to permit entry of propping agent, solid particles of propping agent are suspended in the fracturing fluid and fluid injection is continued to extend the fracture a substantial distance into the formation. The propping agent particles are carried into the fracture and deposited therein to prevent the fracture from closing or healing when the hydraulic pressure is released.

As more particularly illustrated in the drawings, fracture front 30 is initially formed in formation 12 adjacent to well 10 and extended outwardly into formation 12 to form the fracture 32 which is shown as a vertical fracture extending between upper impervious stratum 20 and lower impervious stratum 22. Fractures formed in this manner may extend from the well several hundred feet or more into the formation. Also, while fracture 32 is shown as a single vertical fracture plane, it is to be recognized that a similar fracture or fractures may extend outwardly from the well in different directions, and that the actual fracture may be irregular in configuration.

FIG. 1 illustrates the fracture at the completion of the conventional or first stage of the fracturing operation. Fracture 32 has been extended into the formation to substantially the desired distance from the well as little fracture extension is obtained in the second stage of the process. The propping agent is transported into fracture 32 and deposited between the fracture walls in a thin vertical bank 34, which may be a single monolayer in thickness up to several layers in thickness, depending upon the width of the fracture. The forward part of fracture 32 adjacent to fracture front 30 has been subjected primarily to treatment with the spearhead fluid and will be substantially devoid of propping agent. Also, the upper part of fracture will be free of propping agent. As described more fully by Babcock et al., Producers Monthly, November 1967, pp. 11-17, the propping agent will be deposited in a bank having a maximum height 36 at a point in the fracture removed from the well. Because of the higher fluid velocities in the fracture adjacent to the well, the height of the bank will be lower closer to the well resulting in the bank exhibiting a somewhat tapered height 38. In the region 40 adjacent to the well, the velocity of the fluid exiting the perforations 18 prevents deposit of any substantial amount of propping agent adjacent to the well. When fracturing pressure is reduced, fracture 32 closes or heals except in the propped zones, and only the propped zones exhibit any substantial fluid conductivity. Thus, it is apparent from FIG. 1 that all of the fluid flowing from the formation into the well, or in the case of an injection well, from the well to the formation, must pass through the restricted zone 40.

Figure 2:
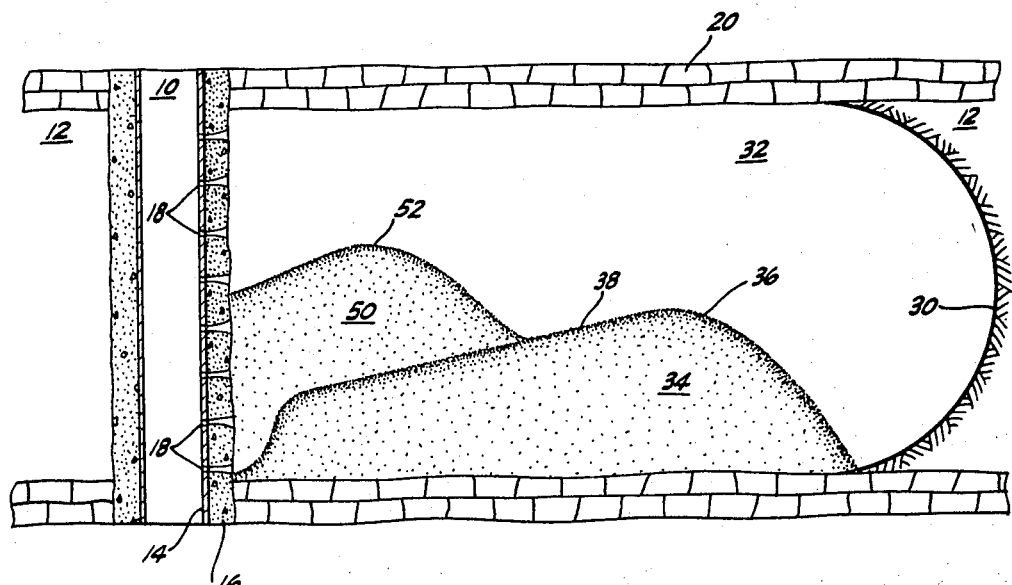
FIG. 2 is a vertical sectional view of the formation illustrating the placement of additional propping agent in the fracture by the second stage treatment of this invention.

In accordance with the method of this invention, when the fracture has been extended a desired distance from the well, the injection of the first stage fracturing fluid is discontinued and the fracture walls treated to increase their permeability to subsequently injected fluids. Next, a second treatment with propping agent is conducted using a fluid having a high fluid loss characteristic to transport the propping agent into the fracture. The permeability of the fracture faces can be substantially restored by injecting a solvent for the fluid loss agent to dissolve the mat or layer of solid particles deposited on the fracture walls in the first stage of the treatment. Upon removal of the fluid loss reducing agent from the fracture walls, the subsequently injected fluid leaks off into the exposed faces of the formation more rapidly, and the fluid dynamics are such that a bank 50 of propping agent is deposited above the previously deposited bank 34 and in the portion of the fracture adjacent to the well. As illustrated in FIG. 2, bank 50 deposited by the second stage treatment can reach a higher maximum packed height 52 than that injected in the first stage treatment, with the packed height generally decreasing toward the well. However, it is apparent from FIG. 2 that a much larger propped section is provided by the two stage treatment of this invention than by the conventional treatment illustrated in FIG. 1, particularly in the critical region of the fracture adjacent to the well.

The solvent employed in removing the fluid loss reducing agent from the fracture walls can be injected in a separate slug between the two propping agent treatments, or alternatively, the high fluid loss characteristic fracturing fluid employed in the second stage treatment can be the solvent for the previously injected fluid loss reducing agent, thus eliminating the need for a separate solvent injection step. In either case, sufficient solvent is injected to remove essentially all of the fluid loss additive from the fracture walls in that part of the fracture adjacent to the well, i.e., for a distance of up to about 50 feet from the well, and it is often advantageous to employ sufficient solvent to remove substantially all of the fluid loss reducing agent from the fracture walls. In most applications, permeability restoration can be achieved by injecting from about 0.5 to 10 gallons of solvent per pound of fluid loss reducing agent injected into the well, and in the case where acid is used to remove the fluid loss reducing agent, from about 10 to 100 percent of the amount of acid required to stoichiometrically react with the previously injected fluid loss reducing agent.

The fracturing fluid employed in the first stage treatment of this invention can be an aqueous liquid, i.e., water, acid, or brine, or it can be an aleaginous liquid such as kerosene and the like. The choice of the fracturing fluid will depend upon the nature of the formation to be fractured, the availability of the fracturing fluid, and the preference of the operator. These fracturing fluids usually are thickened or gelled to reduce the loss of fluid to the formation and to improve the solids carrying capacity of the fluid. Also, fracturing fluid may contain friction reducing additives to reduce friction loss during the pumping operation. Conventional fracturing fluids include fresh water, acid, or brine gelled by the addition of natural gums such as guar gum or by synthetic water-soluble polymers such as the acrylic polymers and copolymers. The oil base fracturing fluids are usually gelled by the addition of a soap such as an alkali metal salt of a fatty acid, e.g., sodium palminate, which is often referred to as napalm.

As indicated above, the particulate solid fluid loss reducing additives used in accordance with this invention must be essentially insoluble in the fracturing fluid, but readily soluble in the subsequently injected solvent. Depending upon the particular choice of fracturing fluid and solvent, the fluid loss reducing additive can be soluble in oil, soluble in acid, or soluble in water.

Representative materials which are insoluble in aqueous carrier liquids and are readily soluble in various commonly available oleaginous solvents are natural asphalts; bitumens; hard waxes such as crystalline and microcrystalline petroleum waxes, beeswax, carnauba wax, spermacetti wax, candellia wax, montan wax, shellac waxes and hydrogenated waxes; blends of wax and oil-soluble polymer; aqueous dispersions of wax stabilized by a colloid gum; fats and hardened oils such as hydrogenated mineral and vegetable oils; greases; and various polycyclic aromatic compounds including naphthalene, anthracene, fluorene and chrysene.

Preferred oil-soluble, water-insoluble fluid loss reducing agents for use with aqueous fracturing fluids are finely divided particles of a homogeneous solid solution of polymer, wax and resin components disclosed in U.S. Pat. No. 3,302,719; solid particles comprised of a homogeneous mixture of polymer and non-gaseous hydrocarbon disclosed in U.S. Pat. No. 3,316,965; solid particles comprised of a homogeneous mixture of polymer and halogenated aromatic hydrocarbon disclosed in U.S. Pat. No. 3,342,263; solid particles comprised of a homogeneous mixture of a polymer component and a solid alcohol disclosed in U.S. Pat. No. 3,363,690; and the small diameter wax and wax-polymer particle compositions disclosed in U.S. Pat. Nos. 3,455,390 and 3,601,194.

A superior fluid loss reducing additive for dispersion in aqueous carrier fluid can be formed from particulate mixtures of wax and surface active agents or blends of wax and polymers including (1) addition polymers of an olefin having between two and four carbon atoms, (2) copolymers of an olefin having between two and four carbon atoms and an alkyl acrylate having not more than about four carbon atoms in the alkyl group, (3) copolymers of an olefin having between two and four carbon atoms and an ester formed by the reaction of butenic acid and an alcohol having no more than four carbon atoms, and (4) copolymers of olefins having between two and four carbon atoms and an ester formed by the reaction of acetic acid and an unsaturated alcohol having no more than about four carbon atoms.

Preferred polymer component materials include polyethylene, polypropylene, polybutylene, copolymers of ethylene and vinyl acetate, and copolymers of ethylene and methyl methacrylate. A single polymer component, selected from the above classes of polymeric substances, may form the polymer component of the composition or two or more such materials can be combined in the blend. Each of the aforesaid polymer components will impart somewhat different properties of solubility, strength, ductility, melting point, density and dispersibility to the final solid wax-polymer blend, and these properties will vary according to the concentration of each component in the composition. Desired properties not obtainable with a single polymeric component often can be achieved with blends of two or more of the polymers.

The above-described waxes or wax-polymer blends are particularly useful as fluid loss reducing agents since they can be formulated into shapes which are deformable, especially under the high pressures used for fracturing, allowing individual particles to conform somewhat in shape to the structure in which they are packed, i.e., to the interstices of the formation.

The solubility and dispersibility of the blends of wax or wax and polymer can be modified by a coating of a surfactant on the particles. Preferred surfactants for use when the fracturing fluid is aqueous are nonionic since they aid in dispersing the particles of wax or wax polymer blend in the carrier fluid and provide compositions resistant to ionic and electrolytic attack.

In some fracturing applications, it is preferable to use fluid loss reducing additives which are insoluble in both non-acidic aqueous liquids and oleaginous liquids, and that are soluble in acids. Suitable materials of this type include finely divided particles of the alkaline earth metal carbonates, especially calcium carbonate, magnesium carbonate and barium carbonate. Natural carbonate containing materials useful as fluid loss reducing agents include finely ground limestone, dolomite, oyster and other sea shells, marble, and the like. Other suitable acid soluble fluid loss reducing agents include polymers such as acid soluble nylon and acid soluble acrylic polymers. These materials are substantially insoluble in non-acidic aqueous liquids, such as water and brine, and in oleaginous liquids, such as crude petroleum and fractions thereof, but are soluble in acids, and particularly in a non-oxidizing acid such as hydrochloric acid, hydrofluoric acid, and mixtures thereof.

Fluid loss reducing agents that are insoluble in the oil-base fracturing fluids, but yet are soluble in aqueous liquids include salts of ammonium and metals of Group I, especially Group IA, and Group II of the periodic table. Materials of this type include the chlorides, bromides, iodides, nitrates, carbonates, oxides, hydroxides, borates, acetates, phosphates, lactates and citrates of lithium, potassium, sodium, ammonium, calcium and magnesium, and mixtures thereof. Of the foregoing, calcium chloride and sodium chloride are particularly preferred. These materials are insoluble in the oil-base fracturing fluids and can be removed from the fracture walls by treatment with water.

Still other water soluble compositions that can be employed as fluid loss agents include organic compounds such as salts of fatty acids, amines, sulfonic acids and carboxylic acids; urea and substituted ureas; and aromatic dicarboxylic and polycarboxylic acids, particularly those having melting points above about 130° F. Representative organic water-soluble, oil-insoluble fluid loss reducing agents comprise finely divided urea, paraformaldehyde, citric acid, ascorbic acid, butane tetra-carboxylic acid, dimethyl fumaric acid, heptane dicarboxylic acid, naphthalene dicarboxylic acids, phthalic acid, benzene sulfonic acid, toluene sulfonic acid, sulfamic acid, trimethylamine oxide and the dihydrochloride thereof, aniline hydrochloride, aniline picrate, acetamide, glycine hydrochloride, and pyridine hydrochloride.

The plugging capabilities of the particles employed as fluid loss reducing agents depends in part upon the size of the particles, it being preferred that a substantial proportion of the particles have average particle diameters of less than about 50 microns. A preferred particle size range is from about 0.5 to about 50 microns, and more preferably from about 0.5 to 30 microns. While the particles may be of substantially uniform size within this range, fluid loss control is enhanced when the particles are of varying sizes within this range. An especially preferred additive comprises particles having the following size distribution:

| Range, Microns | Quantity, Wt.% |
|---|---|
| 0.5–2 | 40–50 |
| 2–3 | 15–25 |
| 3–4 | 5–15 |
| 4–50 | Balance |

The particulate fluid loss additive can be added to the carrier liquid at the well site or, alternatively, a concentrated slurry of additive can be admixed with carrier liquid. In either case, the quantity of added fluid loss reducing agent is controlled to yield a fluid containing about 0.5 to 5 weight percent of the additive. The particular concentration of additive employed will vary depending upon the characteristics of the formation to be fractured and the degree of fluid loss control desired. In general, more permeable structures will require a higher concentration of additive, however, additive contents of 0.1 to 2 weight percent are satisfactory for most applications.

Any of the conventional particulate solid propping agents can be employed. One commonly used propping agent is sand having a grain size within the range of 8 to 40 Tyler mesh (0.016 to 0.093 inches), and preferably within the range of 8 to 20 Tyler mesh (0.033 to 0.09 inches). Other suitable propping agents include cracked nut shells and relatively inert manufactured materials such as steel shot, glass spheres, plastic balls and aluminum particles. However, the invention is not limited to a particular material or size of propping agent, but rather, the methods of this invention will improve distribution of propping agent in a formation when used with any of the fracturing agents known in the art. Also, soluble propping agent spacers of the types conventionally used can be injected with the propping agents to increase the fluid conductivity of the propping agent pack.

In a preferred mode of practicing the invention, an initial spearhead of about 1,000 to 50,000 gallons of fracturing fluid is injected through a well and into contact with the formation under conditions of pressure and volume flow rate that causes a fracture to be formed in the formation adjacent to the well and extended outwardly into the formation. The fracturing fluid can be water, acid, or brine thickened with about 10 to 100 pounds of viscosity increasing agent per 1,000 gallons of fluid or an oleaginous liquid containing a suitable thickening agent, and can contain from about 8 to about 150 pounds per 1,000 gallons of a finely divided fluid loss reducing agent. After the initial spearhead injection, about 1,000 to 30,000 gallons of fracturing fluid containing about 0.1 to 5 pounds per gallon of propping agent is injected through the well and into the formation to extend the fracture into the formation and to prop the fracture open, at least in that portion of the fracture remote from the well. Next, about 0.5 to 10 gallons of solvent per pound of fluid loss reducing agent is injected through the well and into the fracture to dissolve the previously injected fluid loss reducing agent from the fracture walls, at least in that portion of the fracture adjacent to the well. Upon completion of the permeability restoration step, an additional 1,000 to 30,000 gallons of a high fluid loss characteristic fluid containing 0.1 to 5 pounds per gallon of propping agent is injected through the well and into the formation at substantially the same injection rate employed in the fracturing step. The fluid employed in the second stage propping agent treatment can be either an aqueous liquid or an oil, and can contain a viscosity increasing agent to improve the solids carrying capability of the liquid. Where the liquid employed in the second stage propping agent treatment is a solvent for the fluid loss reducing agent, the separate solvent injection step is sometimes omitted.

Also, where an oil-base fracturing fluid is employed in the initial fracturing operation, it is sometimes preferable to inject a small slug of an amphoteric solvent before injecting the main body of the aqueous solvent to remove oil from the surface of fluid loss reducing agent so that it is more readily dissolved in the subsequently injected solvents. Usually, the injection of about 100 to 1,000 gallons of isopropyl alcohol, or similar amphoteric solvent, is adequate for this purpose.

The invention is further described by the following examples which are illustrative of specific modes of practicing the invention and are not intended as limiting the scope of the invention as defined by the appended claims.

EXAMPLE 1

This example illustrates the practice of the invention in a hydraulic fracturing process employing a water base fracturing fluid containing a readily oil-soluble, water-insoluble fluid loss reducing agent. The well to be stimulated is completed at a depth of about 6,000 feet with 5 ½ inch casing cemented in place and gun perforated with two holes per foot throughout a 29-foot producing interval.

The well is prepared for hydraulic fracturing in conventional manner, and the hydraulic fracturing operation is initiated by injecting a 10,000 gallon spearhead of water base fracturing fluid through the well and into the formation at an injection rate of 25 barrels per minute. The fracturing fluid is fresh water gelled by the addition of 40 pounds per 1,000 gallons of guar gum and contains, as a fluid loss reducing agent, 50 pounds per 1,000 gallons of dispersed solid particles of paraffin wax having average particle diameters of about 0.5 to 50 microns. The fracture is extended into the formation and propped by the injection of 10,000 gallons of the gelled fracturing fluid containing 50 pounds per 1,000 gallons of the wax particles and 1 pound per gallon of sand having a size within the range of 10–20 mesh U.S. screen. An injection rate of about 25 barrels per minute is maintained during this injection stage.

After the fracturing step is completed, propping agent is packed in the fracture adjacent to the well by injecting 5,000 gallons of diesel oil containing 1 pound per gallon of 10–20 mesh sand. The sand slurry is injected into the well at a rate of about 25 barrels per minute. Upon completion of this injection step, the well is returned to production. Oil is produced at a substantially higher rate after stimulation than could be obtained prior to the treatment.

EXAMPLE 2

This example illustrates another embodiment of the invention for use in a hydraulic fracturing process employing a water base fracturing fluid containing a readily oil-soluble, water-insoluble fluid loss reducing agent. The hydraulic fracturing treatment is conducted substantially as described in Example 1. However, after the fracturing step is completed, the oil-soluble fluid loss reducing agent is dissolved from the formation faces by injecting 5,000 gallons of diesel oil at a rate of approximately 25 barrels per minute. After the formation permeability has been restored by the solvent treatment, propping agent is placed in the fracture adjacent the well by injecting 5,000 gallons of diesel oil containing 1.0 pound per gallon of 10–20 mesh sand. The well is then returned to production.

EXAMPLE 3

The practice of the invention in a hydraulic fracturing process employing a water base fracturing fluid containing an acid-soluble fluid loss reducing agent to stimulate a water injection well is illustrated by this example. The fracturing operation is conducted substantially as described in Example 1 except that the particulate wax fluid loss reducing agent is replaced with 50 pounds per 1,000 gallons of finely divided calcium carbonate having average particle diameters of 0.5 to 30 microns. Upon completion of the fracturing operation, 550 gallons of 15 percent hydrochloric acid is injected into the well at a rate of 25 barrels per minute. This quantity of acid is equivalent to about 15 percent of the amount of acid required to stoichiometrically react with the previously injected calcium carbonate and is sufficient to substantially remove the calcium carbonate from the exposed formation faces in that portion of the fracture immediately adjacent to the well. After the permeability of the formation in the vicinity of the well has been restored by the acid treatment, 5,000 gallons of fresh water gelled with 40 pounds per 1,000 gallons of guar gum and containing 1 pound per gallon of 10-20 mesh sand is injected into the well at a rate of approximately 25 barrels per minute. Upon completion of the stimulation treatment, flood water is injected at a substantially higher rate than could be injected prior to the treatment.

EXAMPLE 4

This example illustrates the practice of the invention in a hydraulic fracturing process employing an oil base fracturing fluid containing a water-soluble fluid loss reducing agent. The well to be stimulated is described in Example 1.

The well is prepared for hydraulic fracturing in conventional manner, and the fracturing operation conducted and the fracture adjacent to the well packed with propping agent by injecting the following fluids in sequence:

| Injection No. | Injection Rate Barrels/min. | Quantity Injected gallons | Fluid |
|---|---|---|---|
| 1 | 25 | 10,000 | Crude oil containing 50 lbs/M gal. of calcium chloride. |
| 2 | 25 | 10,000 | Crude oil containing 50 lbs/M. gal. of calcium chloride and 1.0 lb/gal. of 10-20 mesh sand. |
| 3 | 25 | 500 | Isopropyl alcohol. |
| 4 | 25 | 5,000 | Water. |
| 5 | 25 | 5,000 | Water gelled with 40 lbs/M gal. of guar gum and containing 1.0 lb/gal. of 10-20 mesh sand. |

The well is returned to production following the treatment.

The calcium chloride employed as the fluid loss reducing agent is finely divided solid calcium chloride having average particle diameters within the range of about 0.5 to 50 microns.

Various embodiments and modifications of this invention have been described in the foregoing specification, and further modifications will be apparent to those skilled in the art. Such modifications are included within the scope of this invention as defined by the following claims:

Having now described the invention, I claim:

1. In a process for fracturing a permeable, subterranean formation traversed by a well wherein a fracturing fluid comprised of a dispersion of particulate solid fluid loss reducing agent and particulate solid propping agent in a viscous carrier liquid is injected through the well and into contact with the formation at a pressure and volume flow rate sufficient to form a fracture and to extend said fracture a substantial distance into the formation, whereby said fluid loss reducing agent is deposited on the exposed faces of the formation to reduce the loss of fracturing fluid thereto and said propping agent is deposited within the fracture at a location remote from the well, the improvement which comprises:

following the injection of said fracturing fluid, treating the exposed faces of the formation so as to substantially restore the permeability of the formation to subsequently injected fluids; and thereafter injecting through the well and into said fracture a particulate solid propping agent dispersed in a carrier liquid having a high fluid loss characteristic.

2. The process defined in claim 1 wherein the exposed faces of the formation are treated by injecting a solvent for said fluid loss reducing agent through the well and into contact with the formation.

3. The process defined in claim 2 wherein sufficient solvent is injected into said fracture to dissolve essentially all of the fluid loss reducing agent from the exposed faces of the formation.

4. The process defined in claim 2 wherein about 0.5 to 10 gallons of solvent is injected into the well per pound of said fluid loss reducing agent injected.

5. The process defined in claim 2 wherein said fluid loss reducing agent is soluble in oil and the solvent is an oil.

6. The process defined in claim 2 wherein said fluid loss reducing agent is soluble in acid and the solvent is an acid.

7. The process as defined in claim 2 wherein said fluid loss reducing agent is soluble in water and the solvent is water.

8. In a process for fracturing a permeable, subterranean formation traversed by a well wherein a fracturing fluid comprised of a dispersion of water-insoluble, oil-soluble, solid particles of fluid loss reducing agent and solid particles of propping agent in a viscous aqueous carrier liquid is injected through the well and into contact with the formation at a pressure and volume flow rate sufficient to form a fracture and to extend said fracture a substantial distance into the formation, whereby said fluid loss reducing agent is deposited on the exposed faces of the formation to reduce the loss of fracturing fluid thereto and said propping agent is deposited within the fracture at a location remote from the well, the improvement which comprises:

following the injection of said fracturing fluid, injecting through the well and into said fracture an oleaginous solvent in an amount sufficient to remove a substantial portion of said previously deposited fluid loss reducing agent from the exposed faces of the formation so as to substantially restore the permeability of the formation to subsequently injected fluids; and thereafter injecting through the well and into said fracture a particulate solid propping agent dispersed in a carrier liquid having a high fluid loss characteristic.

9. The process defined in claim 8 wherein said water-insoluble, readily oil-soluble fluid loss reducing agent is comprised of solid particles of paraffin wax or solid particles of a homogeneous mixture of paraffin wax and polymer.

10. The process as defined in claim 8 wherein sufficient oleaginous solvent is injected into said fracture to remove essentially all of the oil-soluble fluid loss reducing agent from the exposed faces of the formation.

11. In a process for fracturing a permeable, subterranean formation traversed by a well wherein a fracturing fluid comprised of a dispersion of solid particles of an oil and water-insoluble, acid-soluble fluid loss reducing agent and solid particles of propping agent in a viscous non-acidic carrier liquid is injected through the well and into contact with the formation at a pressure and volume flow rate sufficient to form a fracture and to extend said fracture a substantial distance into the formation, whereby said fluid loss reducing agent is deposited on the exposed faces of the formation to reduce the loss of fracturing fluid thereto and said propping agent is deposited within the fracture at a location remote from the well, the improvement which comprises:

following the injection of said fracturing fluid, injecting through the well and into said fracture an acid in an amount sufficient to remove a substantial portion of said previously deposited fluid loss reducing agent from the exposed faces of the formation so as to substantially restore the permeability of the formation to subsequently injected fluids in at least that part of the fracture adjacent to the well; and thereafter injecting through the well and into said fracture solid particles of propping agent dispersed in a carrier liquid having a high fluid loss characteristic.

12. The process defined in claim 11 wherein said oil and water-insoluble, acid-soluble fluid loss reducing agent is selected from the group consisting of carbonates of calcium, magnesium and barium.

13. The process defined in claim 11 wherein said acid is selected from the group consisting of hydrochloric acid, hydrofluoric acid and mixtures thereof.

14. The process defined in claim 11 wherein said acid is injected in an amount between about 10 and 100 percent of the amount of acid required to stoichiometrically react with the fluid loss reducing agent injected into the well.

15. The process defined in claim 11 wherein said carrier liquid having a high fluid loss characteristic is water.

16. A process for fracturing a permeable, subterranean formation traversed by a well comprising:

injecting through the well and into said formation, at a pressure and volume flow rate sufficient to form a fracture and to extend said fracture a substantial distance into said formation, a fracturing fluid comprised of a dispersion of sand and solid particles of an oil-soluble, water-insoluble fluid loss reducing agent comprised of petroleum wax in a viscous aqueous carrier liquid, said particles of fluid loss reducing agent having a size within the range of about 0.5 to 50 microns, whereby said particles of fluid loss reducing agent are deposited on the exposed faces of the formation to reduce the loss of fracturing fluid thereto and said sand is deposited within the fracture at a location remote from the well;

next injecting through the well and into said fracture about 0.5 to 10 gallons of a hydrocarbon oil per pound of said fluid loss reducing agent injected into the well, whereby a substantial portion of said previously deposited fluid loss reducing agent is removed from the exposed faces of the formation so as to substantially restore the permeability of the formation to subsequently injected fluids; and thereafter injecting through the well and into said fracture, at a volume flow rate essentially the same as that used to form and extend the fracture, solid particles of sand dispersed in a carrier liquid having a high fluid loss characteristic, whereby said sand is deposited in the fracture adjacent to the well without substantially extending the fracture further into the formation.

17. The process defined in claim 16 wherein said oil soluble, solid fluid loss reducing agent consists of particles of a homogeneous solid solution of paraffin wax and polymer.

18. The method defined in claim 16 wherein the carrier liquid having a high fluid loss characteristic is hydrocarbon oil.

19. The method defined in claim 16 wherein said carrier liquid having a high fluid loss characteristic is an aqueous liquid.

20. A process for fracturing a permeable, subterranean formation traversed by a well comprising:

injecting through the well and into said formation, at a pressure and volume flow rate sufficient to form a fracture and to extend said fracture a substantial distance into the formation, a fracturing fluid comprised of a viscous, non-acidic carrier liquid having dispersed therein sand and solid particles of calcium carbonate, said particles of calcium carbonate having a size within the range of about 0.5 to 50 microns, whereby said particles of calcium carbonate are deposited on the exposed faces of the fracture to reduce the loss of fracturing fluid to said formation and said sand particles are deposited within the fracture at a location remote from the well;

next injecting through the well and into said fracture an acid selected from the group consisting of hydrochloric acid, hydrofluoric acid and mixtures thereof, said acid being injected in an amount between about 10 and 100 percent of the amount of acid required to stoichiometrically react with the calcium carbonate injected into the well, whereby a substantial portion of said calcium carbonate is removed from the exposed faces of the formation so as to increase the permeability of the formation to subsequently injected fluids; and thereafter injecting through the well and into said fracture, at a volume flow rate essentially the same as that used to form and extend the fracture, solid particles of sand dispersed in an aqueous carrier liquid having a high fluid loss characteristic whereby sand particles are deposited in the fracture adjacent to the well without substantially extending the depth of the fractures into the formation.

21. The process defined in claim 20 wherein the non-acidic carrier liquid having a high fluid loss characteristic is water.

22. A process for fracturing a permeable, subterranean formation traversed by a well comprising:

injecting through the well and into said formation, at a pressure and volume flow rate sufficient to form a fracture and to extend said fracture a substantial distance into the formation, a fracturing fluid comprised of a dispersion of sand and a water-soluble, oil-insoluble fluid loss reducing agent having a size within the range of about 0.5 to 50 microns in a viscous, non-aqueous carrier liquid, whereby said fluid loss reducing agent is deposited on the exposed faces of the fracture to reduce the loss of fracturing fluid to said formation and said sand particles are deposited within the fracture at a location remote from the well;

next injecting through the well and into said fracture 0.5 to 10 gallons of water per pound of said fluid loss reducing agent injected into the well, whereby a substantial portion of said previously deposited fluid loss reducing agent is removed from the exposed faces of the formation so as to substantially restore the permeability of the formation to subsequently injected fluids; and thereafter injecting through the well and into said fracture, at a volume flow rate essentially the same as that used to form and extend the fracture, solid particles of sand dispersed in a carrier liquid having a high fluid loss characteristic, whereby said sand is deposited in the fracture adjacent to the well without substantially extending the fracture further into the formation.

23. The method defined in claim 22 wherein said fluid loss reducing agent is calcium chloride.

24. The method defined in claim 22 wherein a small slug of an amphoteric solvent is injected immediately following the first fracturing treatment.

* * * * *